June 1, 1937. C. A. TRAENKLE 2,082,232
ROLL FILM MAGAZINE
Filed June 13, 1936
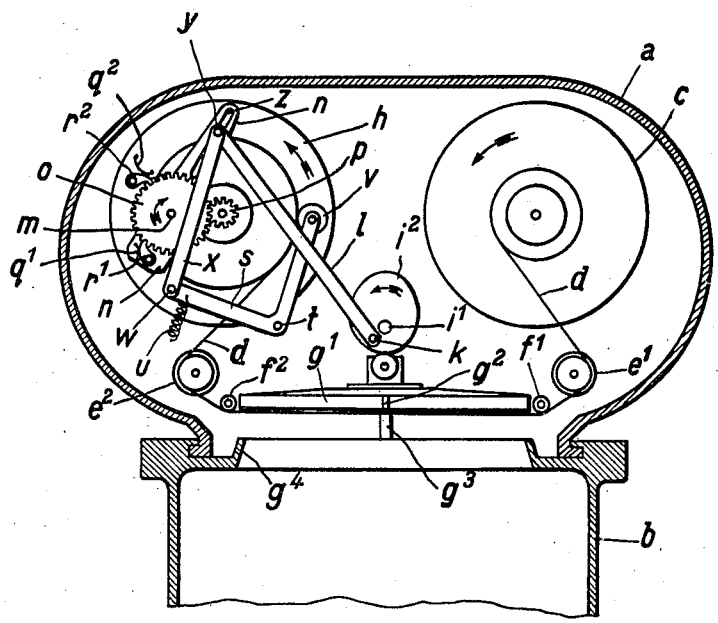
Inventor:
Carl August Traenkle.

Patented June 1, 1937

2,082,232

UNITED STATES PATENT OFFICE 2,082,232

ROLL-FILM MAGAZINE

Carl August Traenkle, Jena, Germany, assignor to firm Carl Zeiss, Jena, Germany

Application June 13, 1936, Serial No. 85,110
In Germany June 18, 1935

1 Claim. (Cl. 242—55)

I have filed an application in Germany, June 18, 1935.

Roll-film magazines containing film supply gears are known in which the change that the increasing thickness of the film-receiving spool requires to be made with respect to the ratio of transmission between driving gear and film-receiving spool is effected by means of contact levers feeling against the film-receiving spool and effecting an adjustment of friction wheels that rotate the film-receiving spool. In the controlable gear according to the present invention, the rotation of the driving crank, which is effected in one sence only, is transformed into a reciprocating motion of a lever, which rotates the film-receiving spool in the one and does not influence this spool in the other direction and which is connected to the crank by means of a rod. It is convenient to have a contact lever feeling against the film-receiving spool by means of a roll to so cooperate with the said reciprocating lever that the point at which the connecting rod acts on the reciprocating lever is displaced towards the end of this reciprocating lever and thus compensates for the increasing thickness of the film-receiving spool, the length of film displaced being, accordingly, permanently the same, regardless of the momentary thickness of the film-receiving spool.

The accompanying drawing illustrates a sectional view of a roll-film magazine according to the invention and of part of the body of the camera to which this magazine is attached.

In the drawing, $a$ and $b$ are the walls of the roll-film magazine and the body of the camera, respectively. From a dispensing spool $c$ supported by the front and the rear part of the wall of the roll-film magazine, a film $d$ can be moved over guide rollers $e^1$ and $f^1$, on a presser plate $g^1$ and over guide rollers $f^2$ and $e^2$ to a receiving spool $h$. A cam disc $i^2$ mounted on a shaft $i^1$ is used as a crank, a crank pin $k$ connecting to the disc $i^2$ a rod $l$ by means of which the rotation of the shaft $i^1$ is transformed into a reciprocating angular motion of a lever $n$ that rotates about a stationary axis $m$ supported by the front and the rear part of the wall of the roll-film magazne. On this axis $m$ is rotatably mounted a toothed wheel $o$ in mesh with a toothed wheel $p$ rigidly connected to the receiving spool $h$. When rotated in the sense indicated in the drawing by the arrow in the toothed wheel $o$, the reciprocating lever $n$ takes the toothed wheel $o$ along by means of a pawl $r^1$ rotatably mounted on this lever $n$ and pressed by means of a spring $q^1$ against the toothed wheel $o$, and the teeth of the wheel $o$ pass unobstructed below a pawl $r^2$ which is rotatably mounted on the front part of the wall of the roll-film magazine and pressed by means of a spring $q^2$ against the toothed wheel $o$. This rotation of the toothed wheel $o$ entails a rotation of the receiving spool in the reverse sense, as a consequence of which the film is wound up. When the reciprocating lever $n$ rotates back in the sense reverse to that indicated by the arrow shown in the toothed wheel $a$, the pawl $r^1$ passes over the teeth of the wheel $o$ without hindering them, and the toothed wheel $o$ is arrested by the pawl $r^2$.

In contrast to friction-wheel drive, there is not to be feared any slip in the above-described rotation of the film-receiving spool by means of a crank, a pawl device and toothed wheels. On the other hand, the rotation of the receiving spool is smooth in spite of the pawl device, because the pawl $r^1$, which takes the toothed wheel $o$ along and, accordingly, rotates the receiving spool $h$, and the pawl $r^2$, which arrests the toothed wheel $o$, operate the film supply gear when the reciprocating motion is reversing, viz. when the angular velocity of the reciprocating lever $n$ is smallest.

In the front wall of the roll-film magazine, a cranked lever $s$ is rotatable about a pin $t$. A spring $u$, whose two ends are fixed to the front wall of the roll-film magazine and to the one arm of the cranked lever $s$, respectively, draws that arm of this lever $s$ which is provided with a roller $v$ to the exterior surface of the film wound on the spool $h$. The rotation of the cranked lever $s$ about $t$ and against the tension of the spring $u$, which is due to the increase in the thickness of the wound-up film, entails a displacement of a rod $x$ connected by means of a link pin $w$ to the cranked lever $s$, which, in its turn, effects that a pin $y$, which passes through the rod $x$ and the connecting rod $l$ and by means of which this connecting rod $l$ is guided in a slit $z$ in the reciprocating lever $n$, is displaced in this slit $z$ towards the end of the reciprocating lever $n$, the consequence being a reduction of the angular movement of the reciprocating lever $n$.

The cam disc $i^2$ is so mounted on a shaft $i^1$ that it presses, in the return period of the unloaded reciprocating lever $n$, against the presser plate $g^1$, which has keys $g^2$ moving in guides $g^3$ worked into the front and the back wall of the roll-film magazine. This pressure against the plate $g^1$ presses the film between the plate $g^1$ and a clamp-on frame $g^4$ of the camera and thus prevents any further displacement of this film, the crank-shaft rotation required for the return of the unloaded reciprocating lever $n$ being thus used for the said pressure against the film.

I claim:

A roll-film magazine, containing a film-dispensing spool adapted to hold an unexposed film, a film-receiving spool adapted to hold an exposed film, a driving shaft, a crank coupled to this shaft, a lever mounted in the wall of the magazine, a rod for interconnecting the crank and the lever, a plate adapted to plane the film to be exposed, and a cam coupled to the film-receiving spool and adapted to operate the said plate in the period of rest of the film supply gear.

CARL AUGUST TRAENKLE.